No. 887,236. PATENTED MAY 12, 1908.
C. DUNBAR.
KNIFE FOR TOPPING TREES AND SHRUBS.
APPLICATION FILED JUNE 11, 1907.
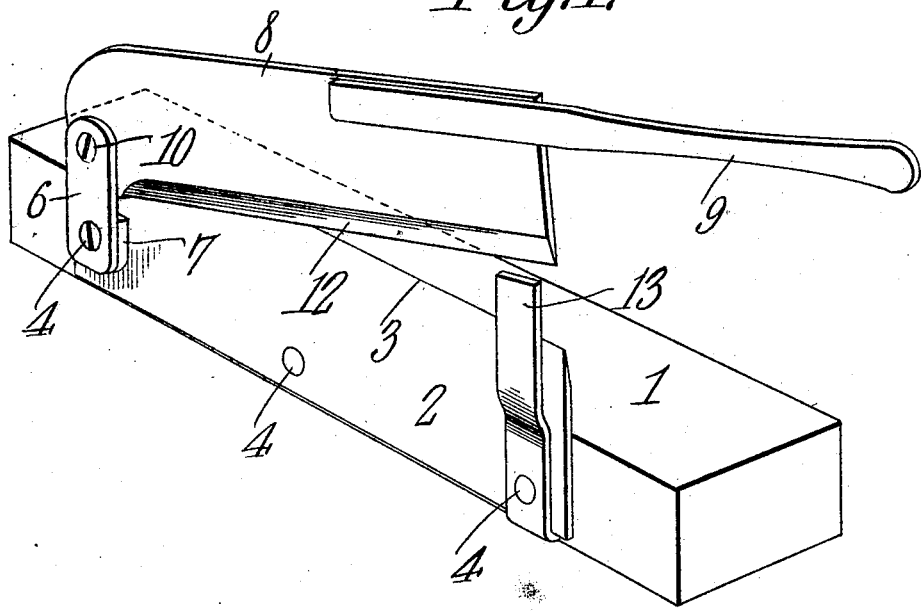
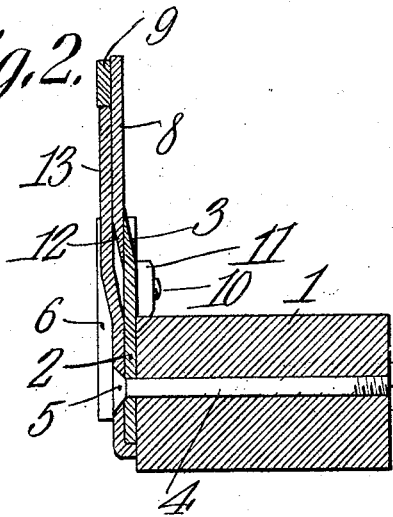
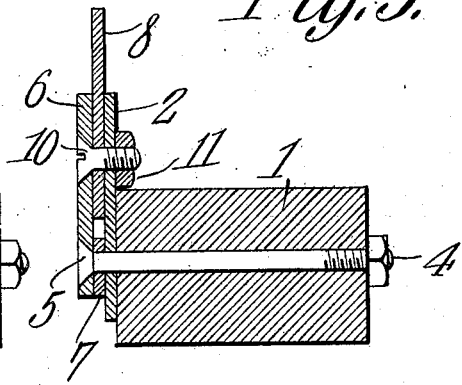
Charles Dunbar,
INVENTOR.
WITNESSES:
By C. A. Snow & Co.
ATTORNEYS

UNITED STATES PATENT OFFICE.

CHARLES DUNBAR, OF WELLINGTON, KANSAS.

KNIFE FOR TOPPING TREES AND SHRUBS.

No. 887,236.　　　　Specification of Letters Patent.　　　Patented May 12, 1908.

Application filed June 11, 1907. Serial No. 378,395.

*To all whom it may concern:*

Be it known that I, CHARLES DUNBAR, a citizen of the United States, residing at Wellington, in the county of Sumner and State of Kansas, have invented a new and useful Knife for Topping Trees and Shrubs, of which the following is a specification.

This invention relates to a cutting apparatus for topping young trees, shrubs, bushes and the like before planting them or finally preparing them for transportation.

The object of the invention is to provide an implement or tool, simple in construction, strongly made and one that will cut sharply through any of the various woody stemmed plants on which it has to work. For this purpose the invention comprises a fixed horizontal knife bolted to a horizontal sill timber, the end of which knife has pivoted thereto the end of a second knife, the latter having a handle for operating it; a guide is secured on the fixed knife to keep the cutting edges of the knives in contact.

In the accompanying drawings: Figure 1 is a perspective view of the knife. Figs. 2 and 3 are cross sectional views through opposite ends of the knives.

Similar numerals of reference indicate the same parts in all the figures.

A horizontal base block or sill 1, preferably of wood, has bolted to one side thereof a knife blade 2 extending longitudinally of the block with its cutting edge 3 parallel thereto and extending above it. The knife blade 2 is secured to the block 1 by bolts 4 passing through the knife blade and block and fastened by nuts on the block side, their heads being on the knife blade side. One of the bolts 4 has its head 5 countersunk into an upright hinge plate 6 between which and the knife blade 2 is a spacing block 7 by means of which a space is formed into which is placed the pivotal end of an upper movable knife 8 having an operating handle 9 and a cutting edge 12 on its under edge. Through suitable holes in the two knives and in the hinge plate 6 a pivot bolt 10 is passed and secured by a nut 11. The knife blades coact in the usual manner, their smooth sides sliding upon each other and are held in contact by a guide plate 13 attached by one or more through bolts 4 at the end of the knife 2 opposite the pivot plate. The top of the guide also serves as a stop for the movable knife, the handle 9 striking it, at the finish of the cutting stroke.

This knife is an exceedingly useful implement for nurserymen and others who cultivate a large number of young trees, shrubs, rose bushes and similar plants, which, before shipping, have their tops cut off or are deheaded.

Having thus described the invention, what what is claimed is:—

A topping knife comprising a fixed horizontal cutting blade bolted to a transportable block, and upright hinge-plates spaced from said blade and bolted thereto and to said block, a movable cutting blade pivoted at one end between the hinge-plate and the fixed blade and adapted to coact with said fixed blade, a vertical guide plate bolted to the other end of the fixed blade and to the block and extending upwardly to form a stop, and a handle fastened to said movable blade and projecting on one side thereof to strike said stop on the downward movement of the blade and limit its descent.

In testimony that I claim the foregoing as my own, I have hereto affixed my signature in the presence of two witnesses.

CHARLES DUNBAR.

Witnesses:
　J. P. WINNER,
　R. S. HUNTER.